(12) United States Patent
Hasegawa et al.

(10) Patent No.: US 10,089,481 B2
(45) Date of Patent: Oct. 2, 2018

(54) SECURING RECORDED DATA

(71) Applicant: International Business Machines Corporation, Armonk, NY (US)

(72) Inventors: Tohru Hasegawa, Tokyo (JP); Hiroshi Itagaki, Kanagawa-ken (JP); Shinsuke Mitsuma, Tokyo (JP); Noriko Yamamoto, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/862,472

(22) Filed: Sep. 23, 2015

(65) Prior Publication Data

US 2017/0083712 A1   Mar. 23, 2017

(51) Int. Cl.
*G06F 21/62* (2013.01)
*G06F 21/60* (2013.01)
*G06F 3/06* (2006.01)
*G06F 17/30* (2006.01)

(52) U.S. Cl.
CPC .......... *G06F 21/6209* (2013.01); *G06F 3/06* (2013.01); *G06F 17/30091* (2013.01); *G06F 21/604* (2013.01)

(58) Field of Classification Search
CPC combination set(s) only.
See application file for complete search history.

(56) References Cited

U.S. PATENT DOCUMENTS

| | | | |
|---|---|---|---|
| 7,765,369 B1 | 7/2010 | Prahlad et al. | |
| 8,170,991 B1 * | 5/2012 | Dhakras | G06F 11/1448 |
| | | | 707/640 |
| 8,650,361 B2 | 2/2014 | Jaquette | |
| 8,918,651 B2 | 12/2014 | Greco et al. | |
| 2009/0235041 A1 * | 9/2009 | Harris | G06F 3/0613 |
| | | | 711/170 |

(Continued)

FOREIGN PATENT DOCUMENTS

| | | |
|---|---|---|
| JP | 2002073397 A | 3/2002 |
| JP | 2004504645 A | 2/2004 |
| JP | 2006331411 A | 12/2006 |
| JP | 2007156865 A | 6/2007 |

OTHER PUBLICATIONS

"Can NBU auto erase tape after data expires?", Symantec Connect, <http://www.symantec.com/connect/forums/can-nbu-auto-erase-tape-after-data-expires>, Created: Jan. 9, 2012, Updated: Jan. 16, 2012, pp. 1-5.

(Continued)

*Primary Examiner* — Jeffrey Pwu
*Assistant Examiner* — Samuel Ambaye
(74) *Attorney, Agent, or Firm* — James H. Mayfield; Jose A. Medina-Cruz

(57) ABSTRACT

A method, executed by a computer, for recording data includes splitting a file into sequential extents, reordering the sequential extents into non-sequential extents, writing the non-sequential extents to a storage medium, writing dummy data to the storage medium, and writing extent placement information corresponding to a placement for the non-sequential extents to the storage medium. A computer program product and computer system corresponding to the above method are also disclosed herein.

14 Claims, 4 Drawing Sheets

(56) References Cited

U.S. PATENT DOCUMENTS

| | | | |
|---|---|---|---|
| 2010/0058476 A1* | 3/2010 | Isoda | G06F 21/6227 726/26 |
| 2012/0093318 A1 | 4/2012 | Obukhov et al. | |
| 2014/0201424 A1* | 7/2014 | Chen | G06F 3/0674 711/103 |
| 2014/0379980 A1 | 12/2014 | Hasegawa et al. | |
| 2015/0146317 A1 | 5/2015 | Abe et al. | |
| 2015/0379430 A1* | 12/2015 | Dirac | G06N 99/005 706/12 |

OTHER PUBLICATIONS

"Electronic health record", Wikipedia, the free encyclopedia, page was last modified on Jul. 9, 2015, at 20:11, <https://en.wikipedia.org/wiki/Electronic_health_record>, pp. 1-26.

"Information destruction and retention requirements", Australian Government, Australian Law Reform Commission, for Your Information: Australian Privacy Law and Practice (ALRC Report 108), 28. Data Security, pp. 1-10.

"Practice Brief—Retention of Health Information (updated)", Table 3: Federal Record Retention Requirements, printed on Jul. 14, 2015, pp. 1-9.

"Retaining personal data (Principle 5)", ICO, Guide to data protection, <https://ico.org.uk/for-organisations/guide-to-data-protection/principle-5-retention/>, printed on Jul. 14, 2015, pp. 1-5.

"Retention and Destruction of Health Information", AHIMA, (updated Aug. 2011), Copyright © 2011, American Health Information Management Association, <http://library.ahima.org/xpedio/groups/public/documents/ahima/bok1_049252.hcsp?dDocName=bok1_049252>, pp. 1-6.

\* cited by examiner

SECURING RECORDED DATA

BACKGROUND OF THE INVENTION

The present invention relates generally to recording data, and more specifically, to controlling read access to recorded data.

In the field of information security, access control is the selective restriction of access to a resource. Permission to access a resource is known as authorization. In the field of computing, access control may be implemented by encoding data in a form that is not immediately readable, such as via encryption, steganography, or the like. Another means of controlling access to data may be to enforce an expiration or deletion date/time on the data, so that the data will become unreadable after said date/time.

SUMMARY

As disclosed herein, a method, executed by a computer, for recording data includes splitting a file into sequential extents, reordering the sequential extents into non-sequential extents, writing the non-sequential extents to a storage medium, writing dummy data to the storage medium, and writing extent placement information corresponding to a placement for the non-sequential extents to the storage medium. A computer program product and computer system corresponding to the above method are also disclosed herein.

DETAILED DESCRIPTION

Embodiments of the present invention relate generally to recording data, and in particular, to controlling access to recorded data. While encryption can be used for access control, an encryption key must be shared in order to provide access to data. Data may be shared with another party with a prearranged understanding that the data will "expire," or cease to be accessible, after a certain period of time. In such a scenario, encryption may not be an ideal form of access control, as different files having different expiration dates will each require their own unique encryption key. Furthermore, forms of access control which involve the erasure of data are not ideal for media that has slow write speeds, such as magnetic tape media. This is because a complete erasure requires that a file's data be completely written over (rather than the file's header be deleted), otherwise the file's contents may be recoverable.

It should be noted that references throughout this specification to features, advantages, or similar language herein do not imply that all of the features and advantages disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
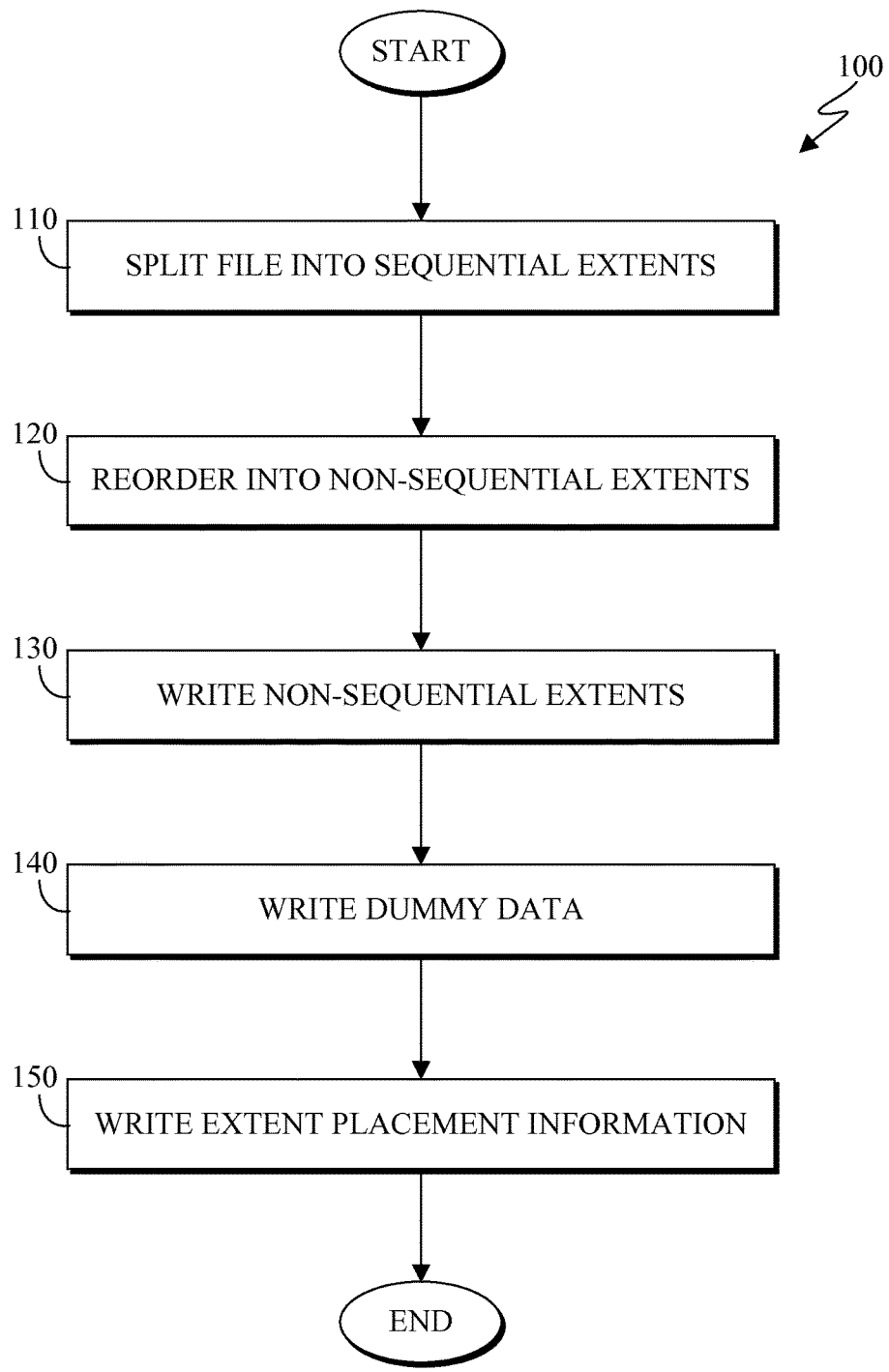
FIG. 1 is a flowchart depicting one embodiment of a data recording method in accordance with the present invention.

FIG. 1 is a flowchart depicting one embodiment of a data recording method 100 in accordance with the present invention. As depicted, the data recording method 100 includes splitting (110) a file, reordering (120) the file, writing (130) the file's extents, writing (140) dummy data, and writing (150) extent placement information. The data recording method 100 splits a file into multiple pieces, known as extents, which may prevent unauthorized users from reading the file.

Splitting (110) a file may include splitting a file into multiple sequential extents. For example, if a file is 120 kb, it may be split into six 20 kb extents, five 24 kb extents, two 60 kb extents, etc. In one embodiment, the extents are different sizes, so for example, a 120 kb file might be split into three extents: e.g., a 45 kb extent, a 55 kb extent, and a 20 kb extent. The size and/or number of a file's extents may be determined according to the output of a random number generator or pseudo-random number generator.

Reordering (120) the file may include reordering the sequential extents into a non-sequential order. The non-sequential order in which the extents are shuffled may be determined based on the output of a random number generator or pseudo-random number generator. This reordering operation 120 may occur in memory prior to the file being written. In some embodiments, dummy data may be generated and placed in between some or all of the non-sequential extents.

Writing (130) the non-sequential extents may include writing the extents to a storage medium in their non-sequential order. Writing (140) dummy data may include writing the dummy data interspersed between some or all of the non-sequential extents. The dummy data and non-sequential extents may be written in a linear fashion (i.e. in one pass) for storage media that operates in a linear read/write pattern, such as hard drives and magnetic tape storage. The dummy data may be written before or after the non-sequential extents, or the two may be written in any sort of order or number of passes, including a purely randomized order.

Writing (150) the extent placement information may include writing to storage media information regarding the placement of the non-sequential extents. The extent placement information may describe the relation of the non-sequential extents that enables the non-sequential extents to be reconfigured into their sequential order so that the original file may be read. The extent placement information may be written on the same or different media than the non-sequential extents. In some embodiments, the extent information is written on the same medium as the non-sequential extents, but on a different partition. The extent placement information may be written into a header or as part of an index which describes the file that is formed by the non-sequential extents. Files 210 may also be written such that extents from various other files appear in between a file; for example, one extent from file A might find itself stored between two different extents for file B alongside some dummy data segments.

Figure 2:
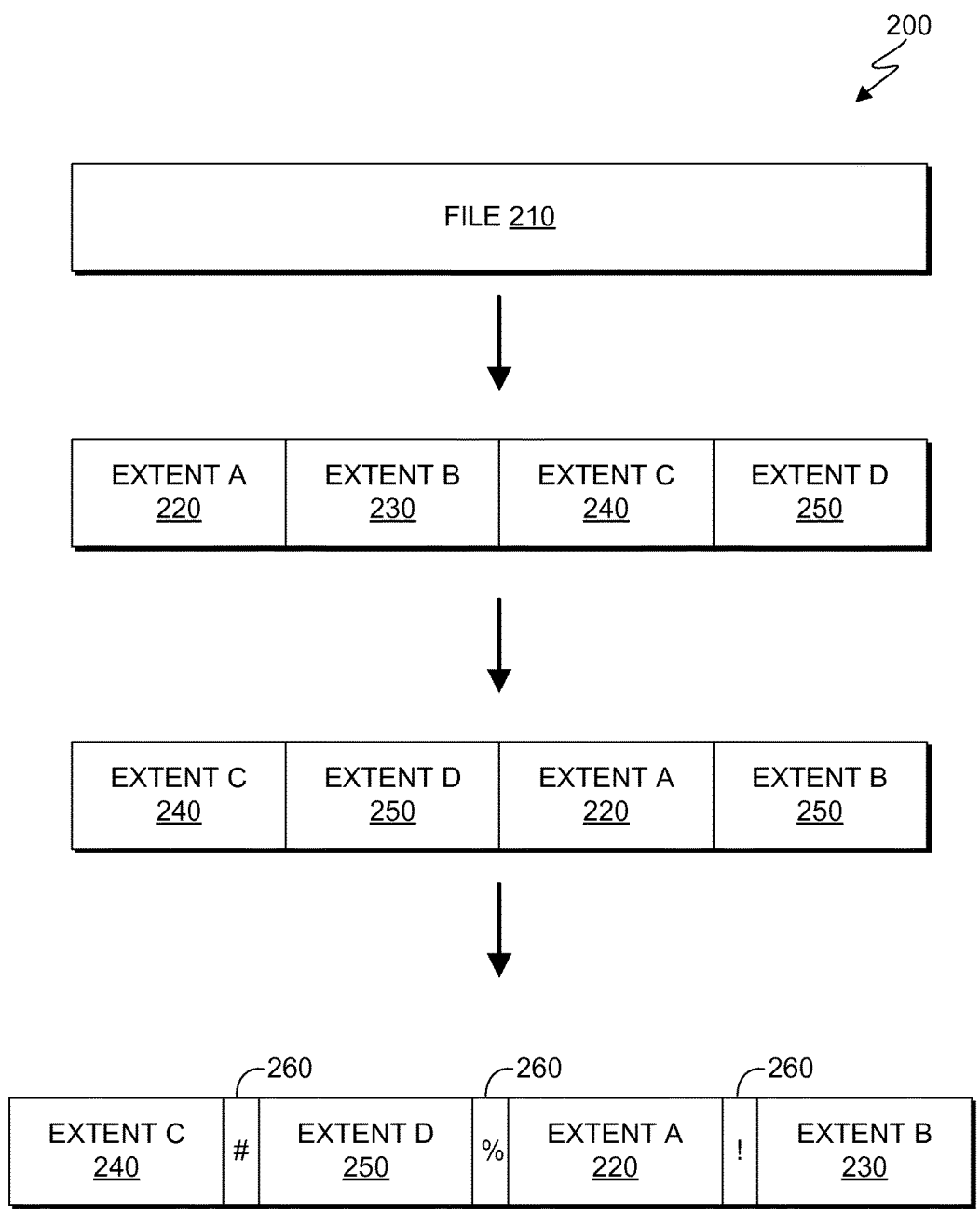
FIG. 2 depicts an example of one embodiment of a recorded file in accordance with the present invention.

FIG. 2 depicts an example 200 of one embodiment of a recorded file in accordance with the present invention. As depicted, the example 200 includes a file 210, extent A 220, extent B 230, extent C 240, extent D 250, and dummy data 260. Before being written, the file 210 is split into extents 220-250, which are then rearranged with dummy data 260 inserted in between.

The file 210 may conform to any sort of file format or may contain raw data. In some embodiments, the file 210 is stored in Linear Tape File System (LTFS) format, which is a file system format for magnetic tape media. As depicted, the file 210 is first split into four extents 220-250. The file 210 may be split into an arbitrary number of extents, and the extents may or may not be of the same size. For example, in the depicted example, each extent 220-250 is the same file size (as indicated by the width of the extent); however, a 100 kb file may just as easily be divided into a 10 kb extent, a 20 kb extent, a 30 kb extent, and a 40 kb extent. As described in the data recording method 100, the size and number of extents may be determined by a predetermined algorithm or by the output of a random or pseudo-random number generator.

The extents 220-250 are originally in the sequential order of the file's data in the original file 210, but after the extent reordering operation 120 the extents are rearranged in a non-sequential order. As depicted, the extents 220-250 have been rearranged such that the order is now extent C, D, A, and then B. Rearranging the extents may make it more difficult to piece the data back into the coherent original order of file 210. In some embodiments, dummy data 260 is inserted between some or all of the extents. Dummy data 260 may be considered an extent of its own that is filled with garbage data that is irrelevant to the file 260. The dummy data 260 may be determined by a predetermined algorithm or by the output of a random or pseudo-random number generator. The insertion of dummy data and splitting and reordering of the file 210 may thus prevent unauthorized access to the file, since reading it from left to right would now result in a nonsensical stream of data consisting of extent C, dummy data, extent D, dummy data, extent A, dummy data, and extent B.

Figure 3:
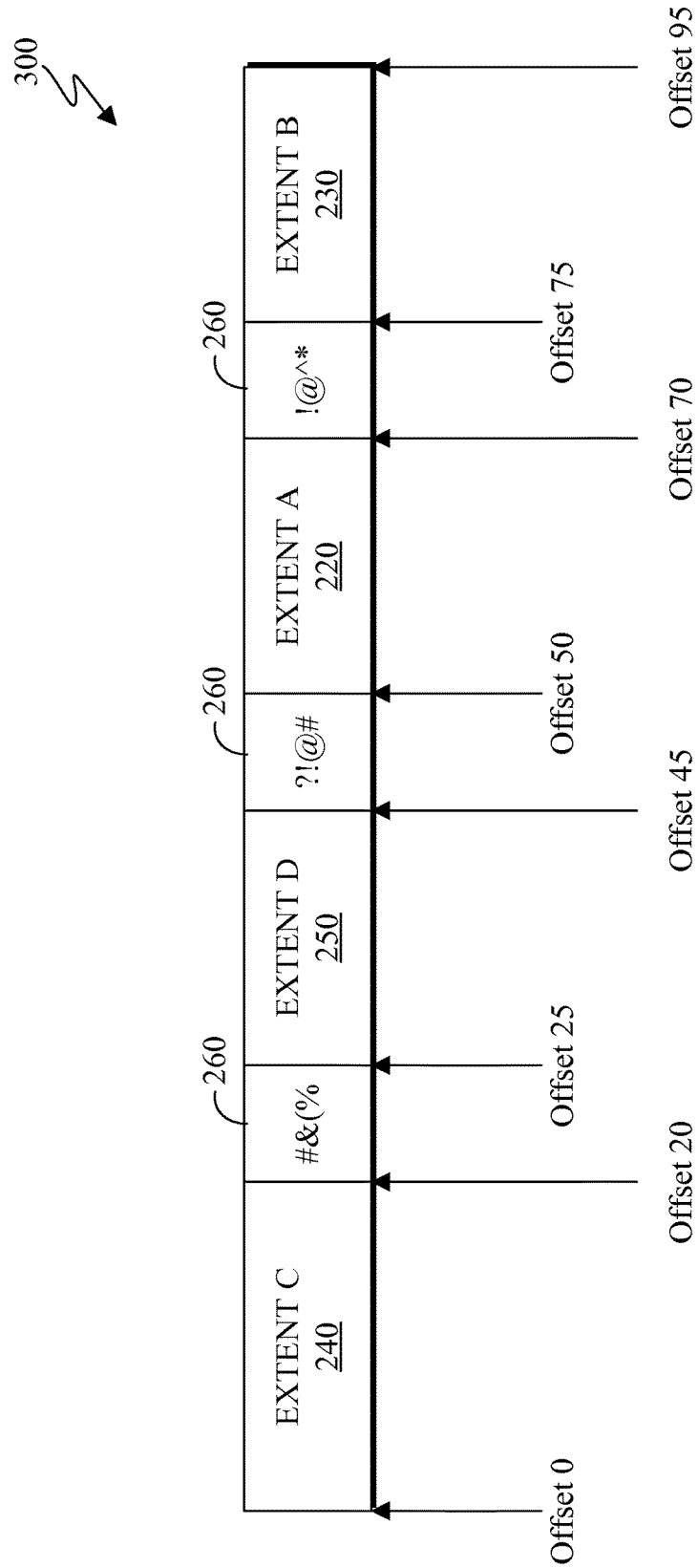
FIG. 3 depicts an example of one embodiment of non-sequential file extents in accordance with the present invention.

FIG. 3 depicts an example 300 of one embodiment of non-sequential file extents in accordance with the present invention. As depicted, the example 300 includes extents 220-250 and dummy data 260, with offsets labeled for the bounds of each extent 220-250 and dummy data 260 portion. The example 300 of non-sequential file extents may depicts how the original file 210 might be written to a storage medium.

As depicted, example 300 has labeled the offsets that define the bounds of the various extents and dummy data. An offset may be considered to be a physical unit of measure on the storage medium, such as a particular sector of a hard drive or position on a reel of magnetic tape in a cassette. Each extent spans 20 offset units, and each section of dummy data 260 spans 5 offset units in the depicted example; this may mean that all of extents contain an equal number of bytes. The starting offset may be any numbered offset; as depicted, the starting offset has been numbered as offset 0 for the purposes of this example.

To make sense of the file 210 as it is written in the example 300, extent placement information must be referenced. The extent placement information may contain instructions for how to assemble the file 210, or data corresponding to the location of each extent. For example, extent placement information for the depicted example may state that in order for file 210 to be properly read, the storage medium's reading apparatus must first go to offset 50 and read to 70 (extent 220), then go to offset 75 and read to 95 (extent 230), then go to offset 0 and read to offset 20 (extent 240), and lastly, go to offset 25 and read to offset 45 (extent 250). Thus, the file 210 would be read in the correct order, as reading from extent A to B to C to D results in the same data order as the original file 210. Thus, the extent placement information may also direct the file-reading process to ignore or skip over dummy data 260. In some embodiments, the data is read from offset 0 to offset 95 and later the file 210 is reassembled in memory.

In some embodiments, the extent placement information is stored in an index. The index may be located on the same storage medium as the non-sequential file extents, on a separate storage medium, or on a different partition of the same storage medium. In some embodiments, the index for each file is stored on an index partition. Since deleting the extent placement information may render the non-sequential file extents unintelligible, deleting the index would essentially delete the file 210. Since the extent placement information may be smaller than the file 210, deleting the extent placement information may be a much faster alternative to deleting the file 210, as removing the extent placement information has the practical effect of preventing any future access to the file 210.

In some embodiments, the index may contain a file expiration time, which is a date and/or time at which the file 210 becomes inaccessible. The file may be rendered inaccessible by deleting the index or the extent placement information. In this manner, a group of different files 210 may each be supplied with their own unique expiration date, enabling a fine degree of control over access. In one embodiment, a file 210 is read by reading the index, comparing the current time/date to the file expiration time/date, and then proceeding to read the non-sequential extents and rearrange into the order that comprises the original file 210. If the current time/date is before the file expiration time/date, then the operation proceeds normally and access to the file is granted. If, however, the current time/date is after the file expiration time/date, then the file may be deleted by deleting the index or extent placement information.

Figure 4:
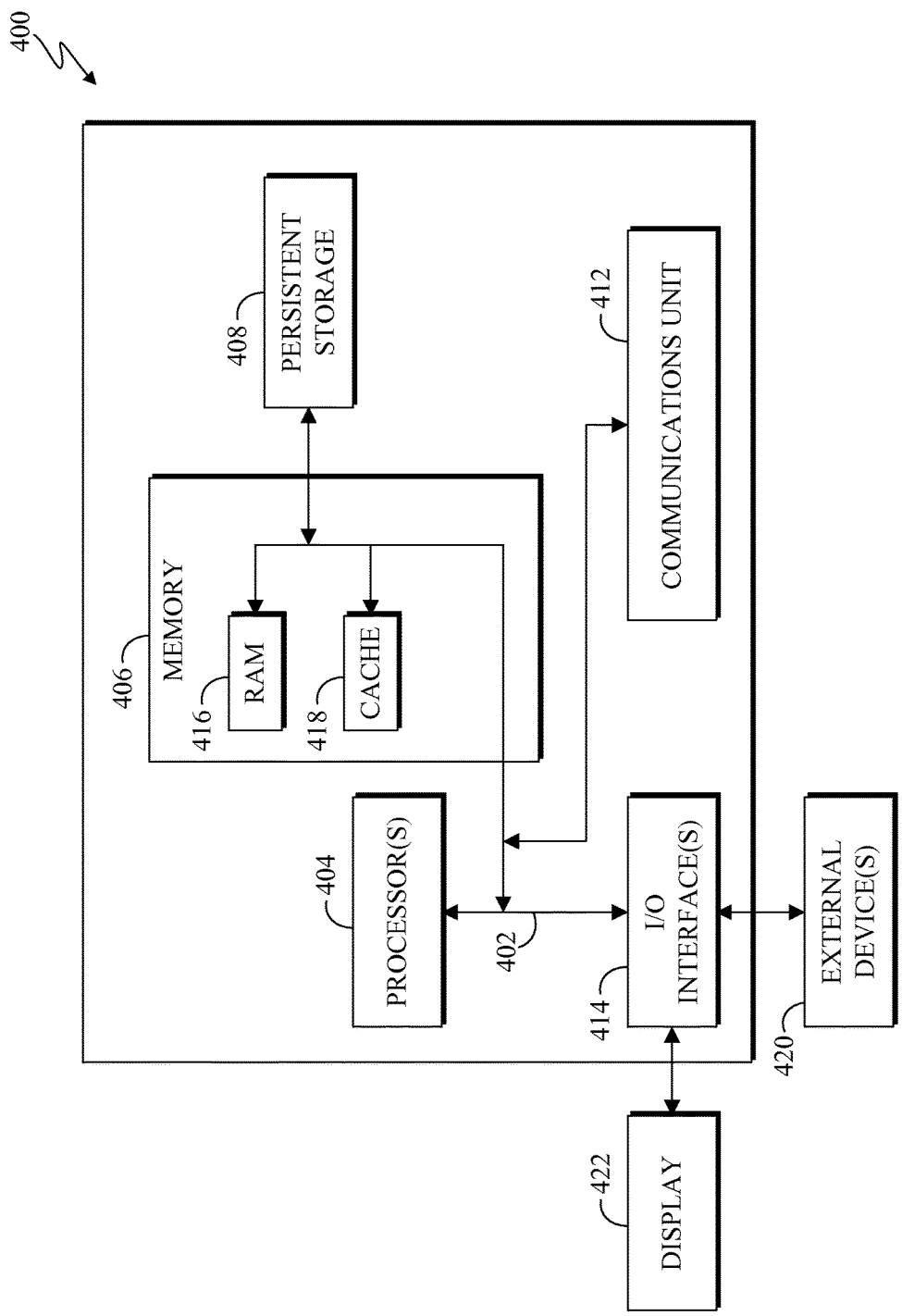
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for securing recorded data, the method comprising:
    splitting a file into a plurality of sequential extents, wherein the file is split in memory prior to the file being written;
    reordering the plurality of sequential extents into a plurality of non-sequential extents;
    writing the plurality of non-sequential extents to a storage medium;
    writing extent placement information corresponding to a placement for the plurality of non-sequential extents to the storage medium, wherein the extent placement information is recorded in an index corresponding to the file, and wherein the index contains a file expiration time corresponding to the file; and
    automatically deleting the file when the index is read at a time that is after the file expiration time.

2. The method of claim 1, further comprising writing dummy data in between the non-sequential extents.

3. The method of claim 1, wherein reordering the plurality of sequential extents into a plurality of non-sequential extents comprises reordering using an order determined by a pseudo-random number generator.

4. The method of claim 2, wherein the dummy data is generated by using a pseudo-random number generator.

5. The method of claim 1, wherein the file is stored in a Linear Tape File System format.

6. A computer system for securing recorded data, the computer system comprising:
    one or more computer processors;
    one or more computer readable storage media;
    program instructions stored therein for execution by at least one of the one or more computer processors, the program instructions comprising instructions to:
    split a file into a plurality of sequential extents, wherein the file is split in memory prior to the file being written;
    reorder the plurality of sequential extents into a plurality of non-sequential extents;
    write the plurality of non-sequential extents to a storage medium;
    write extent placement information corresponding to a placement for the plurality of non-sequential extents to the storage medium, wherein the extent placement information is recorded in an index corresponding to the file, and wherein the index contains a file expiration time corresponding to the file; and
    automatically delete the file when the index is read at a time that is after the file expiration time.

7. The computer system of claim 6, further comprising instructions to write dummy data in between the non-sequential extents.

8. The computer system of claim 6, wherein the instructions to reorder the plurality of sequential extents into a plurality of non-sequential extents comprise instructions to reorder using an order determined by a pseudo-random number generator.

9. The computer system of claim 7, wherein the dummy data is generated by using a pseudo-random number generator.

10. The computer system of claim 6, wherein the file is stored in a Linear Tape File System format.

11. A computer program product for securing recorded data, the computer program product comprising:
    a computer readable storage medium and program instructions stored on the computer readable storage medium, the program instructions comprising instructions to:
    split a file into a plurality of sequential extents, wherein the file is split in memory prior to the file being written;
    reorder the plurality of sequential extents into a plurality of non-sequential extents;
    write the plurality of non-sequential extents to a storage medium;
    write extent placement information corresponding to a placement for the plurality of non-sequential extents to the storage medium, wherein the extent placement information is recorded in an index corresponding to the file, and wherein the index contains a file expiration time corresponding to the file; and
    automatically delete the file when the index is read at a time that is after the file expiration time.

12. The computer program product of claim 11, further comprising instructions to write dummy data in between the non-sequential extents.

13. The computer program product of claim 11, wherein the instructions to reorder the plurality of sequential extents into a plurality of non-sequential extents comprise instructions to reorder using an order determined by a pseudo-random number generator.

14. The computer program product of claim 12, wherein the dummy data is generated by using a pseudo-random number generator.

* * * * *